United States Patent [19]
Martin

[11] 4,149,491
[45] Apr. 17, 1979

[54] ANIMAL WATERING APPARATUS

[76] Inventor: Mervin W. Martin, 8028 Washington St., Kansas City, Mo. 64114

[21] Appl. No.: 784,069

[22] Filed: Apr. 4, 1977

[51] Int. Cl.² .............................................. A01K 7/00
[52] U.S. Cl. .................................................... 119/75
[58] Field of Search .................. 119/71, 72.5, 75, 73

[56] References Cited
U.S. PATENT DOCUMENTS

| 2,710,593 | 6/1955 | Lippi | 119/71 |
| 3,126,873 | 3/1964 | Mikaelsen | 119/75 |
| 3,473,517 | 10/1969 | Jensen et al. | 119/75 X |
| 3,691,997 | 9/1972 | Hatch | 119/73 X |
| 3,745,977 | 7/1973 | Martin | 119/73 |

Primary Examiner—Hugh R. Chamblee
Attorney, Agent, or Firm—Rudolph L. Lowell

[57] ABSTRACT

A watering apparatus for hogs, sheep, goats and the like includes a thermally insulated water storage tank, means for maintaining water at a predetermined level in the tank and a drinking device extended through the side wall of the tank below the level of the water in the tank. The drinking device has an elongated water delivery tube extended through the side wall with a normally closed valve mechanism at its inner end and a mouthpiece on its outer end. An elongated valve stem extends through the water delivery tube for operative connection with the mouthpiece. When the mouthpiece is received within the mouth of an animal and pushed inwardly, the valve mechanism is actuated to initiate a flow of water through the delivery tube and directly into the mouth of the animal.

5 Claims, 8 Drawing Figures

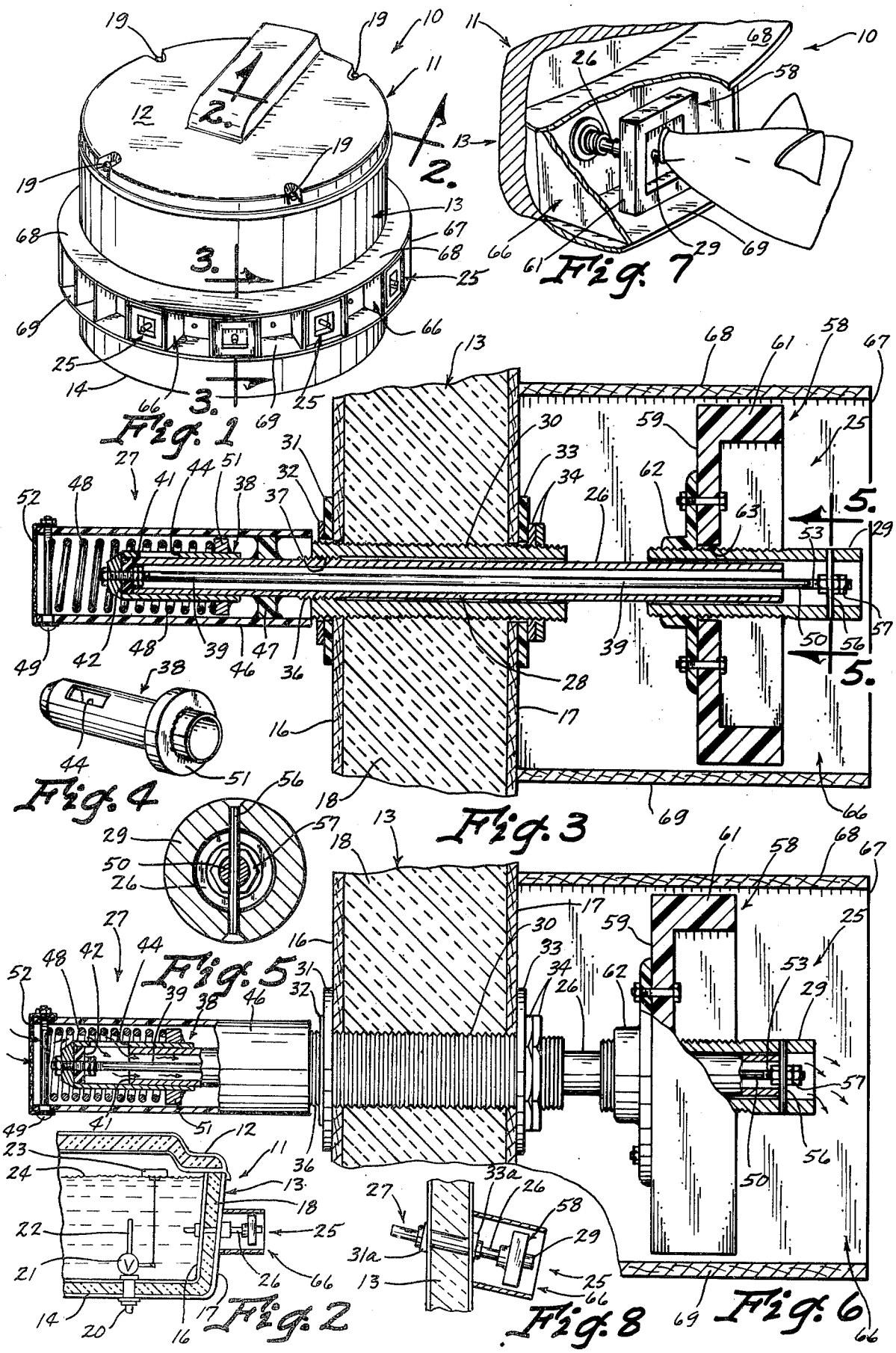

ANIMAL WATERING APPARATUS

SUMMARY OF THE INVENTION

The invention provides an animal watering apparatus of a compact, simple and rugged construction readily operable in freezing temperatures to provide continual animal access to fresh drinking water. Water from the insulated tank is supplied directly to the animal. By virtue of the water being supplied to the insulated tank in direct response to its use, the water remains unfrozen over extended periods of time. Thus, the valve mechanism of the drinking device which is disposed within the tank water is maintained free of any ice formations that might impair its operation. Externally of the tank, the drinking device is inclined downwardly and outwardly for drainage outwardly of any residual water in the water delivery tube when the valve mechanism is closed. The guard structure protects the animal mouthpiece against accidental damage by an animal rubbing thereagainst concurrently with restricting both the movement of and access to the mouthpiece by animals to be watered.

BRIEF DESCRIPTION OF THE DRAWINGS

In the drawings,

FIG. 1 is a perspective view of the animal watering apparatus of this invention, embodying a plurality of drinking devices;

FIG. 2 is a reduced partial transverse sectional view of a drinking device as seen on line 2—2 in FIG. 1;

FIG. 3 is an enlarged detail sectional view of a drinking device taken along line 3—3 in FIG. 1;

FIG. 4 is a perspective view of a movable valve head which forms part of the valve mechanism of a drinking device;

FIG. 5 is an enlarged sectional view of a drinking device as seen on line 5—5 in FIG. 3 showing the connection of an animal mouthpiece to the valve stem of the valve mechanism;

FIG. 6 is a side view of the drinking device illustrated in FIG. 3, with parts broken away to show the valve mechanism in a changed position relative to its showing in FIG. 3;

FIG. 7 is a detail perspective view showing a hog depressing the mouthpiece of a drinking device;

FIG. 8 is a side view of a drinking device illustrated in an inclined relation to the tank sidewall for water drainage purposes.

DETAILED DESCRIPTION OF THE INVENTION

With reference to the drawings, the animal watering apparatus of this invention, indicated generally as 10, is shown in FIGS. 1 and 2 as including a thermally insulated water storage tank 11 of a cylindrical shape having a top cover 12, a side wall 13 and a bottom wall 14 (FIG. 2). The side wall 13 and bottom wall 14 are of a laminated construction including spaced apart inner and outer fiberglass walls or linings 16 and 17, respectively. The space between the linings is filled with a thermally insulative material 18 such as styrofoam. The top cover 12 is of a similar laminar construction and is secured in a covering relation to the side wall 13 by bolts 19 (FIG. 1). The entire wall structure of the tank is thus thermally insulated to prevent water in the tank from freezing during use of the tank under conditions of sub-freezing ambient temperatures. Conversely, during the hot summer months, the insulated walls maintain the drinking water below ambient temperatures.

Referring to FIG. 2, water is supplied to the tank through a supply line 20 connected to a flow control valve 21 located within the tank adjacent the base wall 14. Water from valve 21 enters the tank through an upright inlet pipe 22 until the water reaches a predetermined level, as determined by a float 23. When the level is reached, float 23 actuates the valve 21 to cut off the flow of water into the tank. For a more detailed description of the insulated tank and water supply system, reference is made to U.S. Pat. No. 3,745,977.

Access to water in the tank by animals, especially hogs, is provided by several elongated drinking devices 25 located below the level of the water in the tank, indicated at 24 in FIG. 2, and extended radially through the insulated side wall 13 at spaced positions circumferentially of the tank. Since all of the drinking devices 25 are similar in construction and operation, only one of such devices will be described in detail.

Each drinking device 25 (FIG. 3) includes an elongated water delivery tube 26 having a normally closed valve mechanism 27 on its inner end and a mouthpiece 29 on its outer end for actuating the valve mechanism 27 in response to movement of the mouthpiece by an animal seeking water. An intermediate portion 28 of the tube 26 is within the side wall 13. The water delivery tube 26 is supported in the side wall 13 by means including an externally threaded mounting sleeve 30 shown in FIGS. 3 and 6. A plastic washer 31 and nut 32 seal the inner end of the mounting sleeve 30 against the inner fiberglass lining 16 of side wall 13 to prevent leakage of water through the side wall around the mounting sleeve 30. A similar plastic washer 33 and pair of lock nuts 34 secure the outer end of the mounting sleeve 30 to the tank side wall 13. The water delivery tube 26 is held in a fixed position within the mounting sleeve 30 by means of an externally threaded collar 36 mounted about and welded on the water delivery tube 26 adjacent its inner end. The collar 36 is screwed into an internally threaded recess 37 at the inner end of the mounting sleeve 30.

The normally closed valve mechanism 27 on the inner end of the water delivery tube 26 includes a tubular valve head 38, an elongated valve stem 39 and a valve seat 41 formed by the inner end surface of the water delivery tube 26. The valve head 38 has a replaceable sealing disc 42 arranged within and extended transversely adjacent one end of the valve head 38 which is telescopically slidable over the inner end of the water delivery tube 26 to move the sealing disc 42 into and out of sealing engagement with the valve seat 41. The tubular valve head 38 (FIG. 4) has a water inlet opening 44 through which water flows into the inner end of the water delivery tube when the sealing disc 42 is unseated. Concentrically spaced about the valve mechanism 27 is a cylindrical valve housing 46 extended between the tank lining 16 and inwardly of the valve head 38. An internal shoulder 47 in the housing 46, comprised of a plastic collar, is secured to the water delivery tube 26 to support the housing 46 in a concentrically spaced relation about the valve head 38.

To yieldably hold the valve head 38 in its normally closed position of FIG. 3, a spring 48 mounted about the valve head 38 is arranged in compression between an external annular shoulder 51 at the end of the valve head 38 remote from the sealing disc 42 and a stop pin or bolt 49 extended diametrically through the inner end of the valve housing 46. A filter element or screen 52 is retained across the inner end of the valve housing 46 by the bolt 49.

The elongated valve stem 39 extends axially through the stationary water delivery tube 26 and has an outer end section 50 projected outwardly from the water delivery tube 26. (FIGS. 3 and 6). Since the valve stem is movable with the valve head 38 axially of the delivery tube 26, outward movement of the stem end section 50 is limited by the seating of the disc 42 against the valve seat 41 at the inner end of the water delivery tube 26. Telescopically mounted for movement axially of and on the outer end section 50 of the water delivery tube 26 is the cylindrically shaped mouthpiece 29. The mouthpiece is keyed to the valve stem for movement therewith as a unit by a rivet 56 inserted diametrically through the outer end of the mouthpiece 29 and an externally threaded portion 53 of the valve stem outer section 50. The valve stem is held centrally of the mouthpiece 29 by lock nuts 57 threadable on the section 53 to opposite sides of the rivet 56 (FIG. 5).

With the mouthpiece 29 thus secured to the outer end section 50 of the valve stem 39, an animal need only push the mouthpiece 29 inwardly toward the tank 11 to open the normally closed valve 38 against the action of the spring 48. To facilitate this movement of the mouthpiece, a push member, indicated generally at 58 is fastened to the mouthpiece so as to be engageable by the snout or nose of an animal having its mouth closed on the mouthpiece. The push member 58 (FIGS. 3 and 7) is of a generally square box shape having an upright back wall 59 and an outwardly directed side wall 61. An internally threaded collar 62 is secured to the inner side of the back wall 59 in axial alignment with a central opening 63 formed in the back wall 59. The inner end of the mouthpiece 29 is externally threaded and extended through the back wall opening 63 for threaded engagement within the collar 62.

With the mouthpiece 29 in an animal's mouth, its snout is movable against push member 58, as shown in FIG. 7, whereby the parts of the valve mechanism 27 of the drinking device 25 are moved from their relative positions, shown in FIG. 3, to their corresponding positions shown in FIG. 6. With the valve mechanism 27 in its open position of FIG. 6, limited by the abutment of the rivet 56 against the outer face of the outer end section 50 of the water delivery tube 26, water from the tank 11 flows from the valve housing 46, through the inlet opening 44 in the valve head 38 for passage through the water delivery tube 26 and mouthpiece 29 directly into the mouth of the animal actuating the drinking device 25. Once the animal has had its fill, it need only back away from the watering device 25 which will then operate to automatically cut off the flow of water by the action of compression spring 48 to seat the valve head 38 against the seat 41.

Since the mouthpiece 29 (FIG. 3) projects outwardly from the push member 58, it is exposed to possible damage by being used as an animal scratcher, or by being accidently leaned upon by an animal wanting to lie down in any water that may be about the tank 13. To guard the mouthpiece 29 against such damage there is provided for each drinking device 25 a combination guard and guide structure 66 (FIGS. 3 and 7) of a square tubular shape adapted to loosely receive the push member 58 therein for guided movement longitudinally thereof. Each guard structure 66 is of a length such that when the inner end thereof (FIG. 3) is secured to the outer tank lining 17, the outer end face 67 is located outwardly beyond the mouthpiece 29, when the valve mechanism 27 is in its closed position of FIG. 3.

With a guard structure 66 in a working or loose clearance relation with a corresponding push member 58, excessive bending and torsional movements of the mouthpiece and water delivery tube are eliminated. The guide structures 66 (FIG. 1) may be reinforced against accidental bending movement relative to the tank 13 by a pair of flat annular connecting members 68 and 69 concentrically mounted about the tank 13 for securement to the upper and lower sides of the guide structures 66.

Referring to FIG. 8, a drinking device 25 is shown in a position inclined downwardly and outwardly relative to the tank sidewall 13 to provide for the drainage to the ground of any water remaining in the water delivery tube 26 upon closing of the valve mechanism 27. Such inclination of the drinking device can be easily provided for during its assembly with the tank 11 by forming the washers 31 and 33 of a wedge shape as illustrated for the washers 31a and 33a in FIG. 8.

Although the invention has been described with respect to a preferred embodiment thereof, it is to be understood that it is not to be so limited since changes can be made therein which are within the full intended scope of this invention as defined by the appended claims.

I claim:

1. A animal watering apparatus comprising:
   (a) an insulated tank having a side wall,
   (b) means for maintaining water in the tank at a predetermined level,
   (c) a drinking device extended through the side wall below the level of the water in the tank including an elongated water delivery tube having an inner end portion, a medial portion and an outer end portion, said outer end portion located outside of the tank, said inner end portion within the tank below said water level, and said medial portion within the side wall,
   (d) means for securing said medial portion in a fluid sealed relation with the side wall,
   (e) a normally spring closed valve mechanism for closing said inner end portion against the flow of water therethrough, said valve mechanism including a tubular head telescopically mounted on said inner end portion being provided with an inlet opening and connected to an elongated valve stem extended axially through the water delivery tube having an actuating portion projected outwardly from the outer portion of the water delivery tube,
   (f) a tubular mouthpiece connected to said actuating portion and surrounding said outer portion of the water delivery tube and receivable within the mouth of an animal,
   (g) said valve mechanism, in response to an axially inward movement of the mouthpiece by an animal, that produces like movement of the valve stem in the water delivery tube, said inlet opening in said tubular head being opened to permit a flow of water from within the tank through the water delivery tube and mouthpiece directly into the mouth of an animal.

2. An animal watering apparatus, according to claim 1, wherein:
   (a) said water delivery tube is inclined downwardly and outwardly relative to said tank side wall for drainage of water from the water delivery tube outwardly through the mouthpiece upon closing of said valve mechanism.

3. An animal watering apparatus, according to claim 1, wherein:
   (a) said drinking device includes a push member mounted on and extended generally laterally of the mouthpiece, said push member, when the mouthpiece is received within an animal's mouth, being engageable by a head portion of the animal to move the valve stem inwardly of the water delivery tube to open said valve mechanism.

4. An animal watering apparatus, according to claim 3, comprising:
   (a) a tubular guard structure mounted about said push member with one end secured to the tank side wall for extension outwardly from the tank, said push member and guard structure being of a like shape and of a relative size to provide for a guided movement of the push member within the guard structure.

5. An animal watering apparatus, according to claim 4, wherein:
   (a) said push member is of a generally rectangular box shape having an upright back wall and an outwardly directed side wall, and
   (b) said guard structure is comprised of a tubular member having a corresponding generally rectangular cross sectional shape for receiving the push member for guided movement longitudinally therein.

* * * * *